United States Patent [19]

Watanabe

[11] Patent Number: 4,962,983

[45] Date of Patent: Oct. 16, 1990

[54] LASER OPTICAL APPARATUS

[75] Inventor: Yoshiaki Watanabe, Yokohama, Japan

[73] Assignee: Canon Kabushiki Kaisha, Tokyo, Japan

[21] Appl. No.: 286,851

[22] Filed: Dec. 20, 1988

[30] Foreign Application Priority Data

Dec. 21, 1987 [JP] Japan .................... 62-323290

[51] Int. Cl.⁵ .......................................... G02B 26/10
[52] U.S. Cl. ........................ 350/6.8; 355/233; 250/578.1
[58] Field of Search ............... 350/6.1–6.91, 350/167, 486, 487; 355/233, 237, 229; 250/235, 236, 578

[56] References Cited

U.S. PATENT DOCUMENTS 4,212,530 7/1980 Pitts, Jr. ........................ 355/229

Primary Examiner—Bruce Y. Arnold
Assistant Examiner—Loha Ben
Attorney, Agent, or Firm—Fitzpatrick Cella Harper & Scinto

[57] ABSTRACT

A laser optical apparatus includes a laser source for emitting first and second laser beams, a first lens for passage of the first laser beam, a second lens for passage of the second laser beam, the first lens is on the second lens.

21 Claims, 2 Drawing Sheets

LASER OPTICAL APPARATUS

FIELD OF THE INVENTION AND RELATED ART

The present invention relates to a laser optical apparatus unable with a laser beam printer or the like, more particularly to a laser optical apparatus wherein plural laser beams are emitted and used.

Recently image reading and recording are widely performed by scanning a surface with a laser beam.

In order to increase the scanning speed and/or to form a combined image, it is considered to scan a surface with plural laser beams.

Referring first to FIG. 4, there is shown an example of such an apparatus. The FIG. 4 shows a basic structural elements of the example of a laser beam printer. Plural laser sources 100 are provided, and the plural laser beams emitted from the laser sources 100 are passed through a cylindrical lens 101 and is reflected by a rotational mirror 102 by which it is deflected to scan a photosensitive drum 103, for example. The deflected beams are directed through a group of imaging lenses 104 including an f-$\theta$ lens between the rotational mirror 102 and the photosensitive drum 103 to the surface of the photosensitive drum 103 at a constant linear speed in the direction of the rotational axis of the photosensitive drum 103.

In this system, the plural laser beams L emitted from the laser sources 100 are scanningly projected on the photosensitive drum 103 through one cylindrical lens 103 and imaging lens group 104. This results in that the laser beams L are passed through the lenses at points slightly deviated from the optical axes of the lenses. Therefore, there is a liability that the scanning accuracy by the laser beams on the photosensitive drum 103 is deteriorated by aberration of the lenses or the like. In order to avoid this, it is required that each of the lenses be manufactured with very high accuracy, which increases cost of the apparatus.

It is considered as a possibility that in order to avoid the problem of the deterioration of the scanning accuracy, respective lenses are provided for the laser beams L. However, it then necessitates that each of the lenses has to be positioned with high precision, with the result that the positioning of the lenses relative to the laser beams becomes very complicated.

SUMMARY OF THE INVENTION

Accordingly, it is a principal object of the present invention to provide a laser optical apparatus wherein different lenses are used for the respective laser beams, and the respective lenses are correctly positioned.

It is another object of the present invention to provide a laser optical apparatus wherein respective lenses are used for the laser beams, and a deflecting mirror is used for the plural beams.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
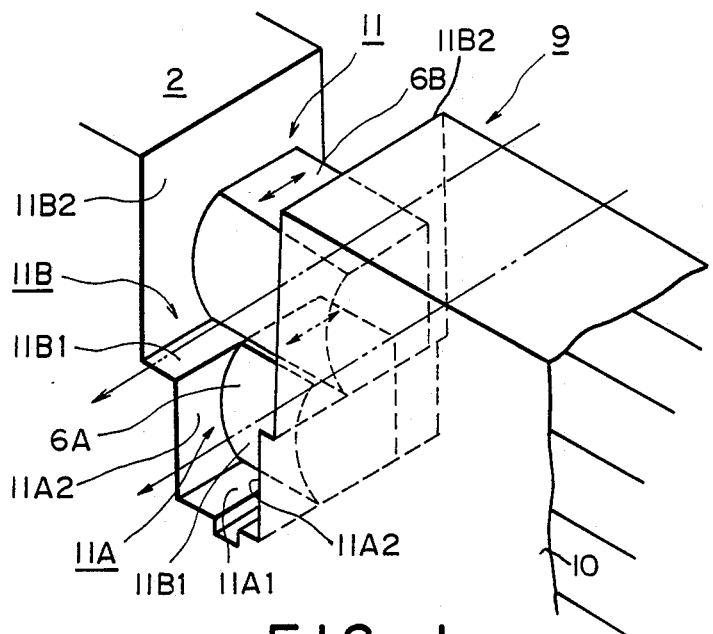
FIG. 1 is an enlarged perspective view illustrating mounting of a cylindrical lens in a laser optical system according to an embodiment of the present invention.

Referring to Figures, preferred embodiments of the present invention will be described, wherein like reference numerals are assigned to the elements having corresponding functions.

Figure 2:
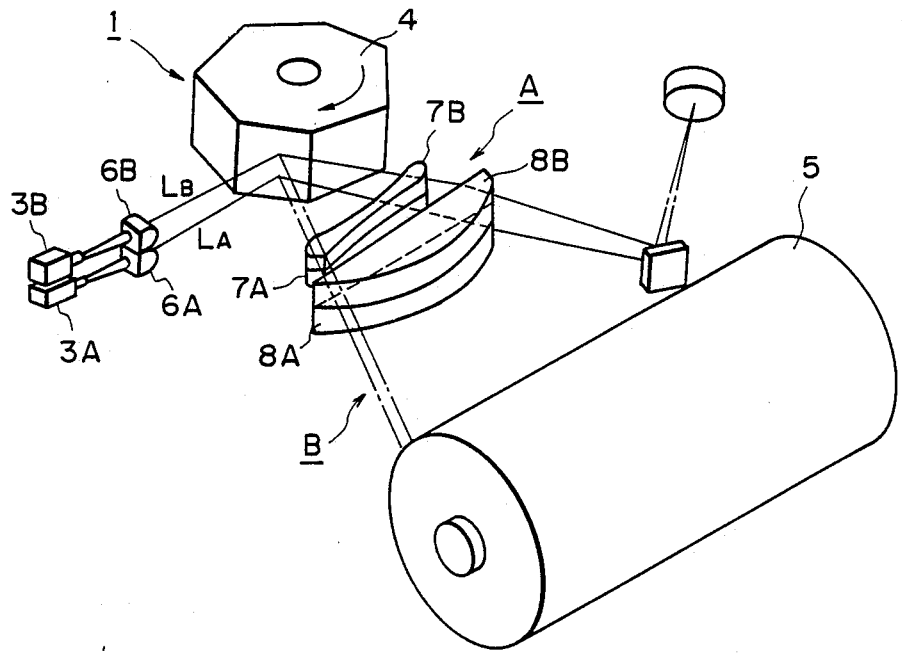
FIG. 2 is a perspective view of a laser optical apparatus according to the embodiment of the present invention.

Referring to FIG. 2, there is shown a laser beam printer according to an embodiment of the present invention. A laser optical apparatus 1 has a two-stage structure including a first scanning optical system A which is located at a lower portion, and a second optical system B on the first scanning optical system A.

A rotational mirror such as a polygonal mirror 4 is provided to scanningly deflect both of the laser beams emitted from the first scanning optical system A and the second scanning optical system B onto photosensitive drum 5, as shown in FIG. 2. Process means for image formation are disposed around the periphery of the photosensitive drum 5. In the first scanning optical system A, a first cylindrical lens 6A for condensing a laser beam is disposed between the first laser source 3A and the rotational mirror 4. Between the rotational mirror 4 and the member 5 to be scanned, a first spherical lens 7A and a first toric lens 8A are disposed for the deflected laser beam to make linear constant speed movement on the member 5 to be scanned.

The second scanning optical system B, similarly to the first scanning optical system A, includes a second laser source 3B, a second cylindrical lens 6B, a secons spherical lens 7B and a second toric lens 8B. They are disposed on the first laser source 3A, the first cylindrical lens 6A, the first spherical lens 7A and the first toric lens 8A, respectively.

Referring to FIG. 1, the positioning and fixing of the cylindrical lenses 6A and 6B will be described. The first and second cylindrical lenses 6A and 6B are supported on a lens supporting member 9 of a housing 2. The lens supporting member 9 includes a vertical wall 10 extending perpendicular to the optical paths of the laser beams $L_A$ and $L_B$ between the rotational mirror 4 and the first and second laser sources 3A and 3B. The upper edge of the vertical wall 10 is opened to form a stepped recess 11. The stepped recess 11 includes an upper large width portion 11B and a lower small width portion 11A. The first and second cylindrical lenses 6A and 6B are mounted in the small width portion 11A and the large width portion 11B, respectively, for slidable movement along the optical axes.

The top surface of the lower cylindrical lens 6A is formed into a flat surface to constitute a positioning surface for the cylindrical lens 6B. By the top surface of the cylindrical lens 6A, the vertical position of the cylindrical lens 6B is automatically determined.

The bottom 11A1 of the recess 11 functions as a reference seat in the vertical direction for the first cylindrical lens 6A. The vertical walls 11A2 and 11A2 of the small width portion function as horizontal (left-right) positioning reference of the first cylindrical lens 6A. Vertical walls 11B2 and 11B2 of the large width portion function as reference surfaces in the horizontal positioning of the second cylindrical lens 6B.

In the laser optical apparatus of the above structure, the mounting of the first and second cylindrical lenses 6A and 6B are mounted into the housing 2 in the following manner. First, the first cylindrical lens 6A is placed in the small width portion 11A of the lens supporting member 9, and then the first cylindrical lens 6A is abutted to the bottom surface 11A1 of the small width portion along the vertical walls 11A2 and 11A2 of the small width portion 11A. By this, the first cylindrical lens 6A is positioned in the vertical and horizontal directions. Therefore, the optical axis of the cylindrical lens 6A is automatically aligned with the first laser source 3A. Subsequently, the lower, that is, the first laser source 3A is energized, and the first cylindrical lens 6A is moved in the direction of the optical axis so that the distance between the first laser source 3A and the first cylindrical lens 6A is adjusted. Thereafter, the first cylindrical lens 6A is bonded and fixed by applying a bonding agent at the engaging portion of the first cylindrical lens 6A with the associated walls.

The second cylindrical lens 6B is mounted in the large width portion 11B of the recess 11, and it is abutted to the top surface of the cylindrical lens 6A, by which the second cylindrical lens 6B is positioned correctly in the vertical and horizontal directions. Similarly, the second laser source 3B is energized, and the position of the second cylindrical lens 6B is adjusted in the direction of the optical axis. Thereafter, the bonding agent is applied to the side of the lens. The fixing of the first and second cylindrical lenses 6A and 6B after the positional adjustment in the direction of the optical axes is not limited to the use of the bonding agent, but may be, for example, made by spring force using a spring.

By using the top surface of the cylindrical lens 6A as a positioning surface for the cylindrical lens 6B, and by placing the cylindrical lens 6B on the top surface of the cylindrical lens 6A, the necessity for the positioning of the cylindrical lens 6B in the vertical direction is eliminated.

In this embodiment, the width of the upper, that is, the second cylindrical lens 6B is larger than that of the lower, that is, the first cylindrical lens 6A, and therefore, the portion 11B has a larger width than the portion 11A.

Regarding the bonding of the lenses by the bonding agent, when the cylindrical lens 6B is bonded from its side, the bonding agent is prevented from flowing down to the lower cylindrical lens 6A. If it occurs, the bonding agent can be deposited on the cylindrical lens 6A, and therefore, the transmissivity of the lens becomes different from intended.

As regards the other lenses, i.e., the first and second spherical lenses 7A and 7B, and the first and second toric lenses 8A and 8B, a lens supporting portion including a stepped recess having a small width lower recess portion is formed, although not shown. The lower recess portions receive the first spherical lens 7A and a first toric lens 8A, whereas the upper portions receive the second spherical lens 7B and the second toric lens 8B. That is, the supporting structures are the same.

As described in the foregoing, according to the present invention, the first and second cylindrical lenses 6A and 6B are correctly and automatically positioned in the vertical and horizontal direction simply by inserting down the first and second cylindrical lenses 6A and 6B into the stepped recess 11. Therefore, the assembling and adjustment are very easy.

Figure 3:
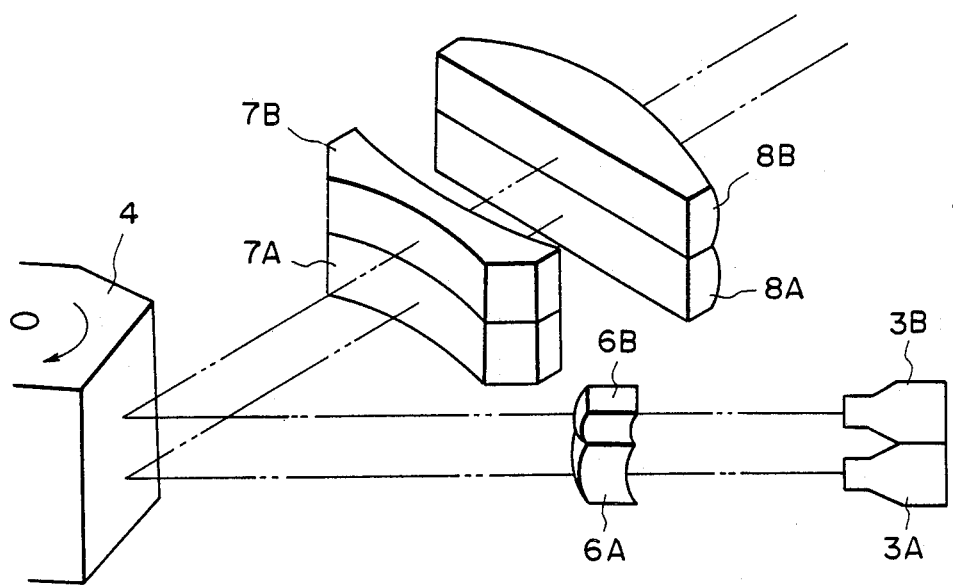
FIG. 3 is a perspective view of a major part of a laser optical apparatus according to another embodiment of the present invention.
Figure 4:
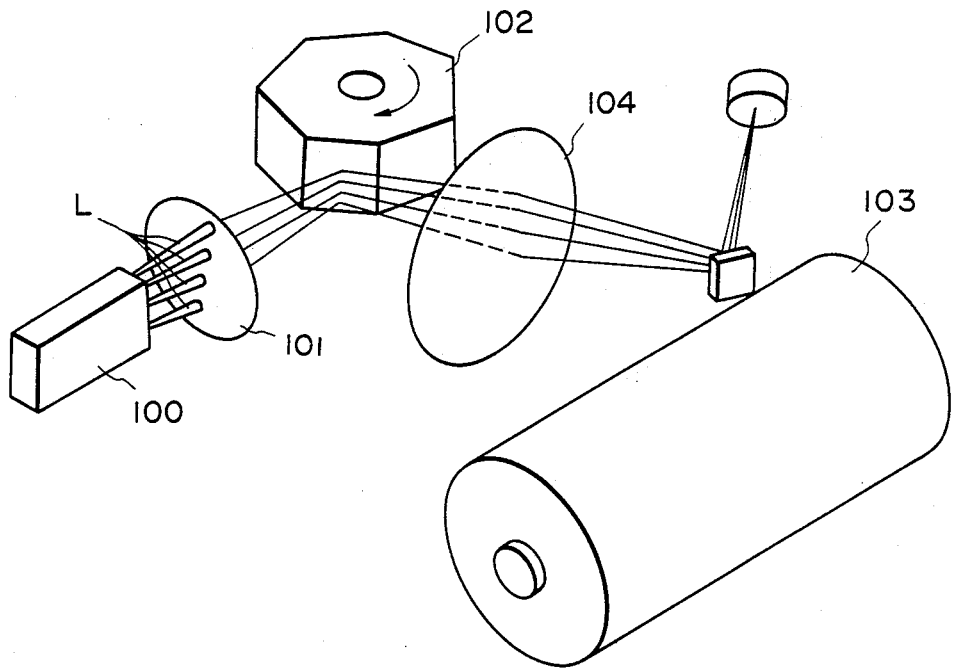
FIG. 4 is a perspective view of a conventional laser beam printer.

Referring to FIG. 3, there is shown another embodiment. In this embodiment, plural lenses having the same configuration are bonded. By positioning and fixing the bonded lens groups (6A, 6B), (7A, 7B) and (8A, 8B) in an unshown housing, the two lenses are positioned at correct positions by a single positioning manipulation, respectively.

While the invention has been described with reference to the structures disclosed herein, it is not confined to the details set forth and this application is intended to cover such modifications or changes as may come within the purposes of the improvements or the scope of the following claims.

What is claimed is:

1. A laser optical apparatus, comprising:
   means for emitting first and second laser beans;
   a first lens for passage of the first laser beam;
   a second lens for passage of the second laser beam, said second lens including top and bottom surfaces; and
   means for positioning the bottom surface of the second lens;
   wherein the top surface of said second lens positions said first lens.

2. An apparatus according to claim 1, further comprising deflecting means for scanningly deflecting the laser beams, wherein said first and second lenses are effective to image the laser beams deflected by said deflecting means on a surface to be scanned.

3. An apparatus according to claim 2, wherein said first and second lenses are generally flat in shape.

4. An apparatus according to claim 1, wherein said first and second lenses are cylindrical lenses having respective powers on a plane perpendicular to a surface of said first lens on which said second lens is disposed.

5. An apparatus according to claim 1, wherein a top surface of said second lens and a bottom surface of said first lens are bonded and fixed together.

6. An apparatus according to claim 1, further comprising deflecting means for scanningly deflecting the laser beams, wherein said laser optical apparatus is used in a laser beam printer having a movable photosensitive member which is scanned with the laser beams.

7. An apparatus according to claim 1, further comprising a deflecting mirror for scanningly deflecting both of the first and second laser beams.

8. An apparatus according to claim 7, wherein said deflecting mirror is a rotational polygonal mirror.

9. A laser optical system, comprising:
   laser emitting means for emitting first and second laser beams;
   a first lens for passage of the first laser beam;
   a second lens for passage of the second laser beam, wherein said first lens is disposed on said second lens; and
   positioning means for positioning a bottom surface of said second lens.

10. An apparatus according to claim 9, wherein a top surface of said second lens functions as a reference for said first lens.

11. An apparatus according to claim 10, wherein a top surface of said second lens and a bottom surface of said first lens are bonded and fixed together.

12. An apparatus according to claim 9, wherein a width of said first lens measured in a direction perpendicular to optical axes of said first and second lenses is larger than that of said second lens.

13. An apparatus according to claim 9 or 12, further comprising a second positioning portion for positioning a vertical wall of each of said first and second lenses.

14. An apparatus according to claim 12, further comprising a third positioning portion for positioning a bottom surface of said first lens.

15. An apparatus according to claim 9, further comprising deflecting means for scanningly deflecting the laser beams, wherein said first and second lenses are effective to image the laser beams deflected by said deflecting means on a surface to be scanned.

16. An apparatus according to claim 15, wherein said first and second lenses are generally flat in shape.

17. An apparatus according to claim 9, wherein said first and second lenses are cylindrical lenses having respective powers on a plane perpendicular to a surface of said first lens on which said second lens is disposed.

18. An apparatus according to claim 9, further comprising deflecting means for scanningly deflecting the laser beams, wherein said laser optical apparatus is used in a laser beam printer having a movable photosensitive member which is scannec with the laser beams.

19. An apparatus according to claim 9, further comprising a deflecting mirror for scanningly deflecting both of the first and second laser beams.

20. An apparatus according to claim 19, wherein said deflecting mirror is a rotational polygonal mirror.

21. An apparatus according to claim 1 or claim 9, wherein said first lens is directly contacted on said second lens.

* * * * *

UNITED STATES PATENT AND TRADEMARK OFFICE
CERTIFICATE OF CORRECTION

PATENT NO. : 4,962,983

DATED : October 16, 1990

INVENTOR(S) : YOSHIAKI WATANABE

It is certified that error appears in the above-identified patent and that said Letters Patent is hereby corrected as shown below:

COLUMN 1

Line 7, "unable" should read --usable--.

COLUMN 4

Line 18, "first and second laser beans;" should read --first and second laser beams;--.

COLUMN 6

Line 7, "scannec" should read --scanned--.

Signed and Sealed this

Twenty-first Day of May, 1991

Attest:

HARRY F. MANBECK, JR.

Attesting Officer      Commissioner of Patents and Trademarks